Aug. 22, 1933.  C. L. WALKER  1,923,597
BEARING LUBRICATOR
Filed April 17, 1931

INVENTOR.
Clinton L. Walker.
BY Townsend, Loftus & Abbett
ATTORNEYS.

Patented Aug. 22, 1933

1,923,597

UNITED STATES PATENT OFFICE 1,923,597

BEARING LUBRICATOR

Clinton L. Walker, Piedmont, Calif.

Application April 17, 1931. Serial No. 530,854

6 Claims. (Cl. 184—11)

This invention relates to a bearing lubricator and especially to a method of lubricating the upper and lower bearings of a connecting rod or the like.

The bearing lubricator forming the subject matter of this application is intended for use in connection with a splash feed system of lubrication and advantage is taken of centrifugal action and the force of adhesion between a film of oil and a rotating surface to circulate the oil under pressure through the bearings.

The object of the present invention is to generally improve and simplify the construction and operation of bearing lubricators; to provide a bearing having a pair of grooves formed in its inner surface, the outer ends of the grooves extending to the end of the bearing and the inner ends communicating with an oil outlet; to provide means for delivering oil to the outer ends of the grooves; to provide means whereby centrifugal action may be utilized to force the oil thus delivered into the outer ends of the grooves and cause circulation of the oil therethrough; to provide grooves which are helical in shape and of opposite pitch so that the force of adhesion between the film of oil and the rotating surface of the shaft may be utilized to further force and circulate the oil through the bearing; and, further, to provide means whereby the oil discharging from the bearing may be conveyed upwardly along a connecting rod to lubricate the wrist pin.

The bearing lubricator is shown by way of illustration in the accompanying drawing, in which—

Figure 1:
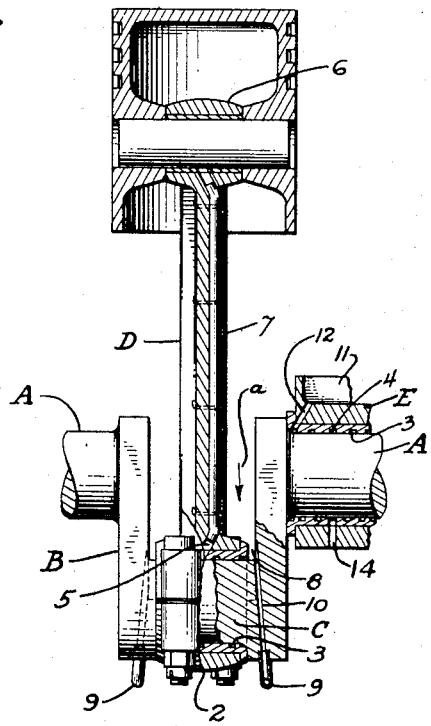
Fig. 1 is a side elevation of a crank shaft showing one end of the shaft supported in a journal bearing and also showing a connecting rod applied to the crank pin of the shaft.
Figure 2:
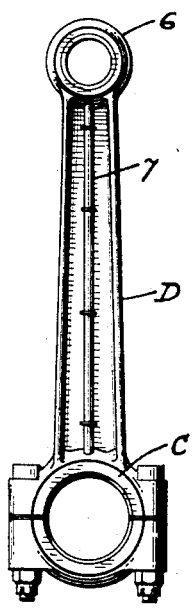
Fig. 2 is a side view of the connecting rod.

Referring to the drawing in detail and particularly Fig. 1, A indicates a crank shaft, B the webs of the shaft, C the crank pin, and D the connecting rod attached thereto. The crank shaft is journalled in bearings indicated at E and means are provided whereby the connecting rod bearings and the crank shaft bearings may be automatically lubricated by a splash feed system or the like. The manner of lubricating the connecting rod will first be described.

Figure 4:
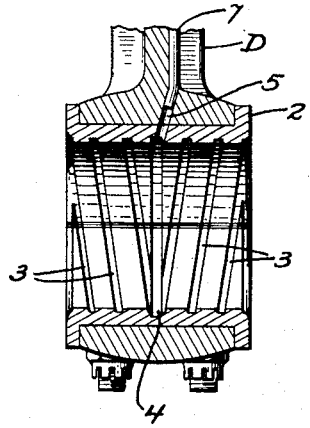
Fig. 4 is a sectional view of the lower connecting rod bearing showing the helical grooves formed in the inner surface of the bearing.

By referring to Fig. 4, it will be noted that the lower connecting rod bearing indicated at 2 has a pair of helical grooves 3 cut in its inner surface. These grooves are of opposite pitch. They extend to the outer ends of the bearing and at their inner ends communicate with an annular groove 4 which in turn communicates with an oil outlet 5. The grooves 3 are for all practical purposes capillary in size as they are only one sixty-fourth of an inch deep and approximately one thirty-second of an inch wide. Oil is delivered to the outer ends of the grooves as will hereinafter be described and when it enters the grooves a film of oil is presented. The cohesion between this oil and the surface of the rotating crank pin is very considerable and the oil is accordingly pulled inwardly through the helical grooves due to the relation of pitch and rotation of the crank pin. The oil discharges into the center groove 4 and finally out through the outlet opening 5. If it is desired to lubricate the wrist pin bearing indicated at 6, the oil is conveyed from the outlet 5 by means of a tube 7 secured to one side of the rod and this in turn discharges the oil into the wrist pin bearing 6.

Figure 3:
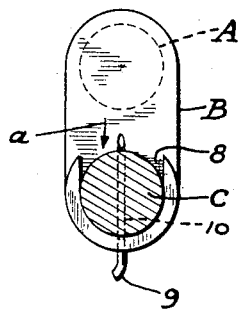
Fig. 3 is an end view of a portion of the lower end of one of the webs.

The manner of delivering the oil to the outer ends of the helical grooves 3 is accomplished as follows: by referring to Figs. 1 and 3, it will be noted that a portion of the inner surfaces of the crank webs B are cut away at a point adjacent the outer ends of the connecting rod bearing 2. The cutaway portion forms pockets 8 at opposite ends of the connecting rod bearing which are in communication with the outer ends of the helical grooves. A pair of scoops are formed on the outer ends of the crank shaft webs as indicated at 9. These will, during rotation of the crank shaft, dip into the oil in the crank case and the oil thus dipped or scooped up is delivered through passages 10 to the pockets 8 and as such drain into the outer ends of the helical grooves where the oil upon entrance is acted upon by the force of adhesion and thus forced to circulate inwardly through the bearing. In actual practice centrifugal force is also applied to the oil delivered to the pockets 8, this centrifugal action being due to the rotation of the crank shaft. The direction of the centrifugal force is that indicated by the arrows a. The oil is thus placed under pressure in the lower portion of the pockets and as such enters the helical grooves under pressure thereby further aiding circulation of oil through the connecting rod bearing and also forcing it upwardly through the tube 7 to lubricate the wrist pin 6.

By again referring to Fig. 1, it will be noted that the crank shaft bearing E is provided with an oil cup or reservoir 11 on its upper surface. The inner surface of the bearing has a pair of helical grooves formed therein similar to those shown in Fig. 4. Oil is delivered by splash action into the cup 11 and drains therefrom through ducts 12 to the opposite ends of the bearing. The oil here enters the outer ends of the helical grooves and the force of adhesion is then utilized to circulate the oil inwardly to the central groove 4 from where it discharges through opening 14 formed in the lower side of the bearing, hence circulation of oil under pressure is maintained not only through the connecting rod bearings but also through the main crank shaft bearings, the circulating system being automatic and the oil employed being supplied by splash action in the crank case. High oil pressures in the bearings may be obtained due to the fact that centrifugal action and the force of adhesion is utilized and it is accordingly possible to maintain a heavy film of oil between the rotating surfaces and it is also possible to maintain a greater clearance between the rotating surfaces when compared with common practice.

Having thus described my invention, what I claim and desire to secure by Letters Patent is—

1. A lubricator for connecting rods comprising in combination a crank shaft having webs and a crank pin, a connecting rod having a bearing embracing the crank pin, said bearing having an oil outlet formed intermediate its ends, helical grooves formed in the inner surface of the bearing and extending from opposite ends of the bearing to the oil outlet, said grooves being pitched in opposite directions with relation to the direction of rotation of the crank pin so as to force oil inwardly from the ends of the bearing to the oil outlet, pockets formed on the adjacent faces of the crank webs and in communication with the outer ends of the helical grooves, and splash actuated means for delivering oil to said pockets.

2. A lubricator for connecting rods comprising in combination a crank shaft having webs and a crank pin, a connecting rod having a bearing embracing the crank pin, said bearing having an oil outlet formed intermediate its ends, helical grooves formed in the inner surface of the bearing and extending from opposite ends of the bearing to the oil outlet, said grooves being pitched in opposite directions with relation to the direction of rotation of the crank pin so as to force oil inwardly from the ends of the bearing to the oil outlet, pockets formed on the adjacent faces of the crank webs and in communication with the outer ends of the helical grooves, scoops formed on the webs of the crank shaft adapted to gather oil during rotation of the crank shaft, and means for conveying the oil from said scoops to the pockets.

3. A lubricator for connecting rods, comprising in combination a crank shaft having webs and a crank pin, a connecting rod having a bearing embracing the crank pin, said bearing having an oil outlet formed intermediate its ends, helical grooves formed in the inner surface of the bearing and extending from opposite ends of the bearing to the oil outlet, said grooves being pitched in opposite directions to each other and the direction of rotation of the crank pin being such as to force oil inwardly from the ends of the bearing to the oil outlet, pockets formed on the adjacent faces of the crank webs and in communication with the outer ends of the helical grooves, scoops formed on the webs of the crank shaft, said webs having passageways formed therein between the scoops and said pockets for conveying oil to the pockets.

4. A lubricator for connecting rods comprising in combination a crank shaft having webs and a crank pin, a connecting rod having a bearing embracing the crank pin, helical grooves formed in the inner surface of the bearing and extending inwardly from opposite ends of the bearing, said grooves being pitched in opposite directions with relation to the direction of rotation of the crank pin so as to force oil inwardly from the ends of the bearing, pockets formed on the adjacent faces of the crank webs and in communication with the outer ends of the helical grooves, and splash actuated means for delivering oil to said pockets.

5. A lubricator for connecting rods comprising in combination a crank shaft having webs and a crank pin, a connecting rod having a bearing embracing the crank pin, helical grooves formed in the inner surface of the bearing and extending inwardly from opposite ends of the bearing, said grooves being pitched in opposite directions with relation to the direction of rotation of the crank pin so as to force oil inwardly from the ends of the bearing, pockets formed on the adjacent faces of the crank webs and in communication with the outer ends of the helical grooves, scoops formed on the webs of the crank shaft adapted to gather oil during rotation of the crank shaft, and means for conveying the oil from said scoops to the pockets.

6. A lubricator for connecting rods, comprising in combination a crank shaft having webs and a crank pin, a connecting rod having a bearing embracing the crank pin, helical grooves formed in the inner surface of the bearing and extending inwardly from opposite ends of the bearing, said grooves being pitched in opposite directions to each other and the direction of rotation of the crank pin being such as to force oil inwardly from the ends of the bearing, pockets formed on the adjacent faces of the crank webs and in communication with the outer ends of the helical grooves, scoops formed on the webs of the crank shaft, said webs having passageways formed therein between the scoops and said pockets for conveying oil to the pockets.

CLINTON L. WALKER.